United States Patent Office 3,422,665
Patented Jan. 21, 1969

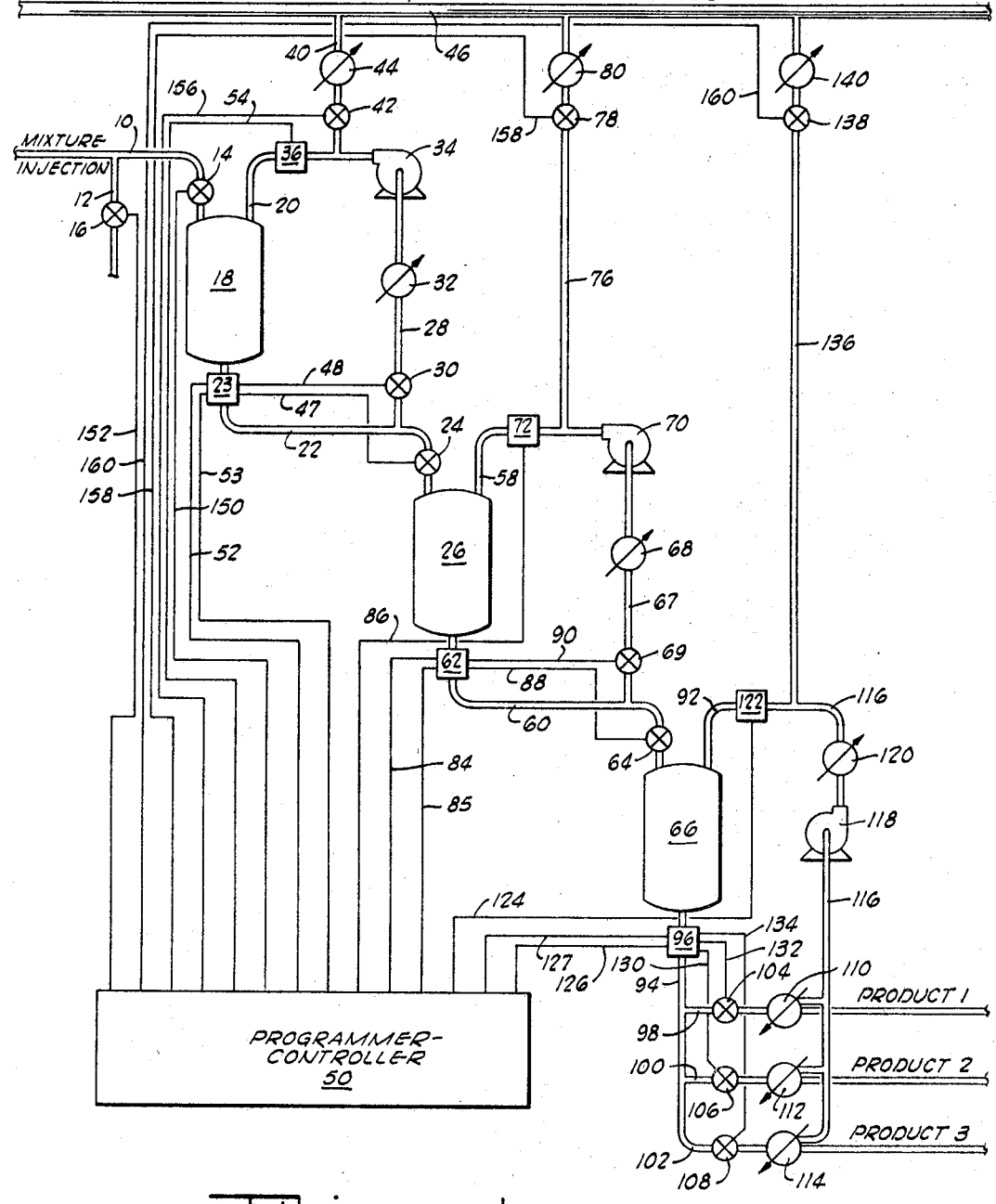

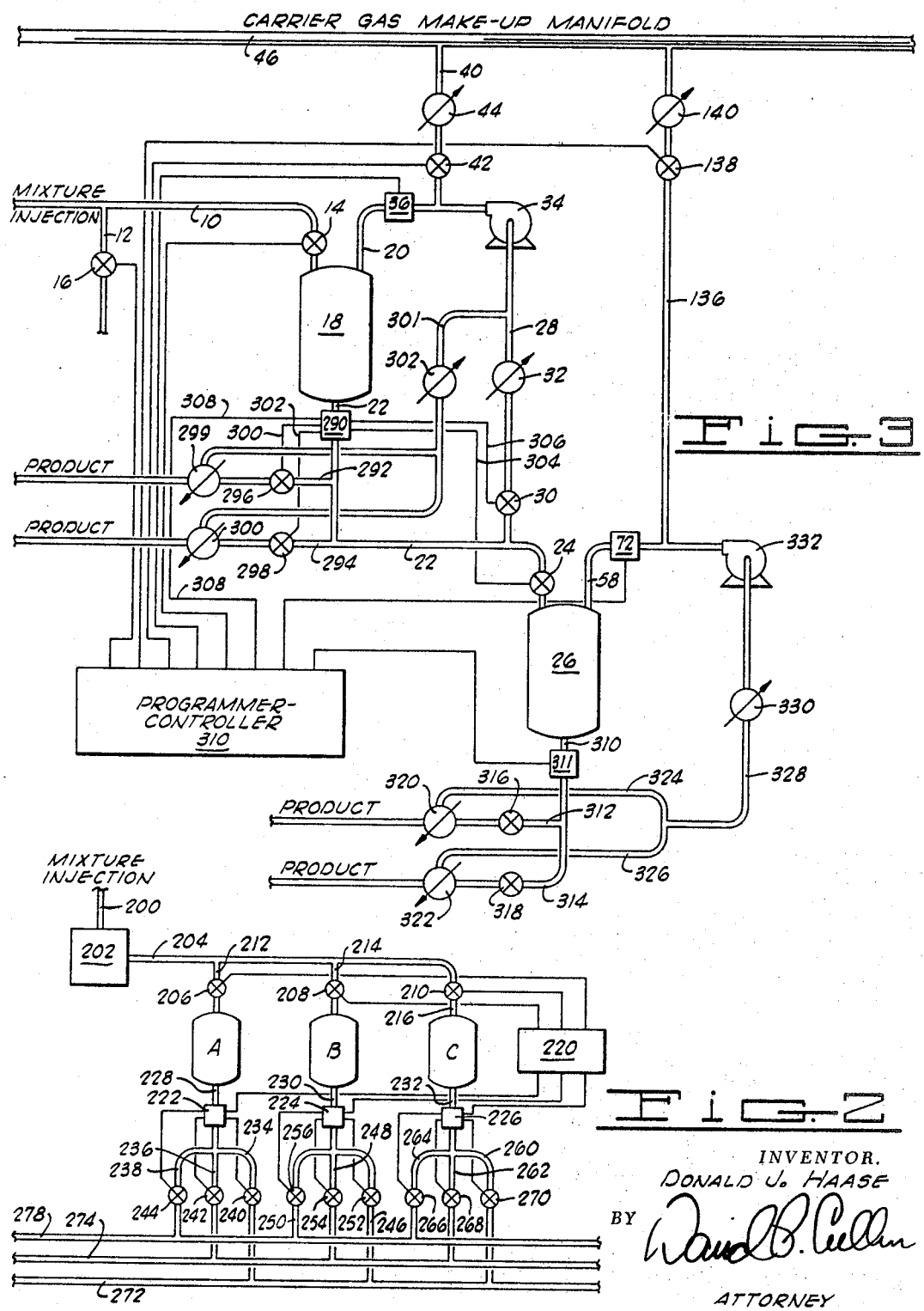

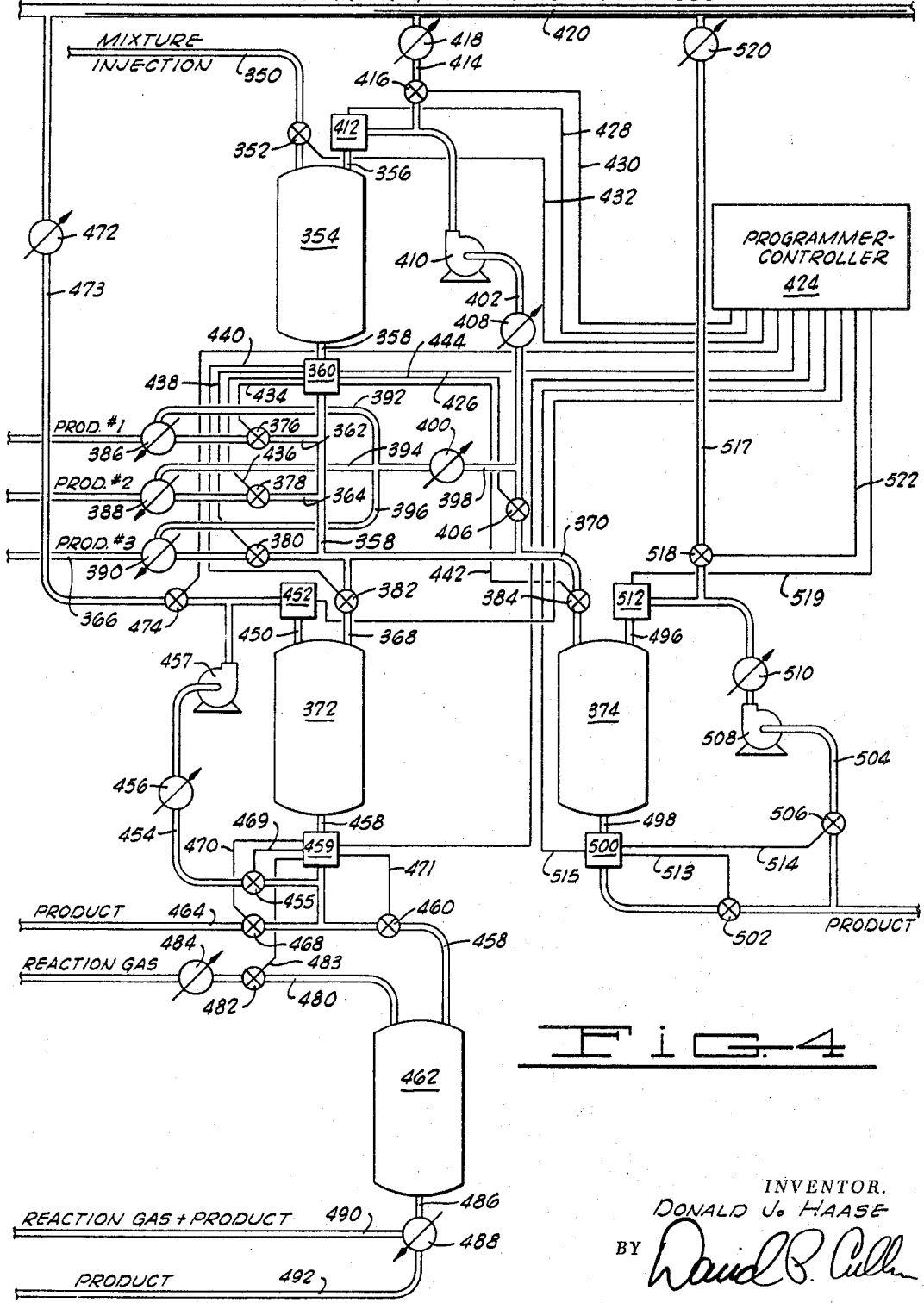

3,422,665
CHROMATOGRAPHY SYSTEM
Donald J. Haase, Ponca City, Okla., assignor to Continental Oil Company, Ponca City, Okla., a corporation of Delaware
Filed Aug. 1, 1966, Ser. No. 569,219
U.S. Cl. 73—23.1                                       32 Claims
Int. Cl. G01n 31/08

ABSTRACT OF THE DISCLOSURE

Chromatographic separation is effected in a plurality of serially connected columns arranged for repressuring of each column during passage therethrough of the sample.

---

This invention relates to chromatography systems in which the total pressure drop across the chromatographic separating zones used in the system is reduced. More specifically, but not by way of limitation, the invention relates to multisectioned chromatographic columns in which a relatively small but selectively variable pressure drop is maintained across the several column sections, with the pressure and temperature obtaining in each column section being controllable independently of the temperature and pressure in every other column section. The invention also relates to a method of chromatographic fractionation by which a relatively small pressure drop is attained across the separatory packing material while simultaneously providing a relatively large number of theoretical plates in the body of the packing material.

In gas chromatography, it is frequently desirable or necessary to have very long columns in order to attain the number of theoretical plates in the column which are required to separate or resolve difficulty separable components of a gaseous mixture. The use of such elongated columns, however, requires a relatively large pressure drop to be maintained across the column, and this requirement is frequently attended with difficulties which tend in some measure to counteract the benefits otherwise accruing from the use of such columns. Thus, a higher initial or input pressure must be developed requiring more expensive gas compressors, and in the case of some gaseous mixtures, the vapor pressures of the components are such that the mixtures cannot be successfully directed through columns across which there are very large pressure drops.

The present invention provides a method of gas or vapor chromatographic separation in which the total pressure drop across a given amount of chromatographic separatory packing material having a high total number of theoretical plates can be minimized. The apparatus used in the practice of the method comprises a unique arrangement of several chromatographic column sections, which arrangement provides great versatility in the types of separations and/or analyses which can be carried out.

Broadly described, the chromatographic system of the invention comprises a plurality of column sections which are serially interconnected for sequential flow of gases therethrough, with means being provided for independently adjusting the pressure drop across each of the column sections by the controlled introduction of a pressurizing gas to the inlet of each section. In a preferred embodiment of the invention, the pressurizing gas which is independently controlled and introduced to the inlet of each column section is the inert carrier gas used to sweep the gaseous mixture through the separatory packing of the column sections, and is obtained at least in part by recycling a portion of the carrier gas eluted from the respective column sections, and in part by adding make-up carrier gas to this recycle stream. Appropriate valving is provided between the column sections to permit selective direction of effluent from each section either into the next column section or, by recycle, to the inlet of the preceding section. Suitable component sensing devices are disposed in the effluent streams from each column section for the purpose of determining the time at which the several resolved components of a gaseous mixture are eluted from the column. Finally, programming or control means is connected to the sensing devices, and is responsive to signals developed by these devices to control the valves used for selecting the flow paths of the effluents from each section, as well as to control one or more valves provided in the sample input conduit to the first column section traversed by the gaseous mixture to be resolved.

In the use of the described system for practicing the method of the invention, a mixture of components to be separated is introduced in vapor or finely divided liquid form to the inlet of the first column section, and the pressure drop across the column is adjusted as desired, and to a relatively low value, by selective control of a pressurizing gas simultaneously introduced to the column. The effluent from the first column section is, at least in part, directed to a second column section where further separation of components is effected. After the portion of the effluent from the first column section moves into the next column section, the first column section is isolated from the second, and the pressure drop across the second section is then independently adjusted by the controlled introduction of the pressurizing gas thereto. This sequence can be repeated through as many column sections as may be desired in order to achieve the desired number of theoretical plates to accomplish the required separation, while simultaneously maintaining a low pressure drop across each individual column section.

From the foregoing description of the invention, it will have become apparent that a major object of the invention is to provide a method for chromatographically separating the components of a mixture using a separatory packing material equivalent, in its resolving power, to a large number of theoretical plates in a distillation column, but requiring the establishment of a relatively small pressure drop thereacross.

Another object of the invention is to provide improved gas chromatography apparatus characterized in having a high theoretical plate equivalent, and a low pressure drop across the column packing material which effects the chromatographic separation.

An additional object of the invention is to provide a versatile gas chromatography system in which a great variety of vapors or low boiling liquid mixtures can be separated into a plurality of components in a rapid and efficient manner.

A further object of the invention is to provide an automatically programmed, continuously operated chromatographic system for continuously resolving a mixture into a plurality of individual components.

Other objects and advantages, in addition to those described, will become apparent as the following detailed description of the invention is read in conjunction with the accompanying drawings which illustrate several embodiments of the invention.

In the drawings:

FIGURE 1 is a schematic flow diagram illustrating one embodiment of the chromatographic system of the invention and showing the routes of fluid flow through the system as well as certain electrical controls used in the system.

FIGURE 2 is a schematic block diagram illustrating the manner in which several systems of the type illustrated in FIGURE 1 are used in combination for the purpose of providing semi-continuous chromatogrphic separation of a flowing fluid stream.

FIGURE 3 is a modified embodiment of the invention similar in several basic respects to the system illustrated by the schematic flow diagram of FIGURE 1, but showing several variants which may be employed in the system.

FIGURE 4 is a schematic flow diagram of yet another embodiment of the invention.

Before referring specifically to the accompanying drawings, a short discussion of one of the most important principles of the invention will be helpful in understanding the process which is employed therein. In resolving a gaseous mixture by the use of a chromatographic column, a pressure drop $\Delta P$ must be provided across the column in order to assure that the mixture and the inert carrier gas used to move it through the column will progress through the column in a reasonable time, and that the desired separation of components will occur. The magnitude of the pressure drop $\Delta P$ will be dependent upon several factors, such as the diameter of the column, the properties of the fluids introduced to the column, the length of the column and the characteristics of the column packing material, such as porosity, density, particle size and the like.

In the past, it has been the usual practice to provide very long chromatographic columns for the purpose of resolving a mixture of difficulty separable components, since such columns provide a relatively large number of theoretical plates, and thus possess greater separating capability. The increased length of such columns, however, has required the provision of a substantially higher $\Delta P$ across the column in order to move the carrier gas and mixture through the column in a satisfactory interval of time. This necessary increase in the pressure drop across elongated columns of the type described has been attended with certain difficulties, the character of which has been previously mentioned.

The principle of the present invention is that by providing a number of relatively short, serially connected column segments, and providing independent control of the pressure drop across each of these segments, the $\Delta P$ across any one of the segments can be maintained relatively low, and the total number of theoretical plates represented by the total packing material contacted by the components can be maintained at a high value. In other words, where $n$ column segments are used, and a small pressure drop $\Delta p$ is maintained across each segment, the total pressure drop across the system of serially interconnected column segments will be $n\Delta p$ and will be equivalent to the total pressure drop $\Delta P$ which would be required if all the segments were integrally formed as a single elongated column. Yet, assuming the outlet pressure, $p_o$, from each segment to be slightly above atmospheric pressure, with the segmented column arrangement, the input or initial pressure, $p_i$, to each column need only be a relatively small fraction of that which would be required in a single elongated conventional column. This fact provides marked advantages in terms of rate of separation, operating efficiency, and particularly, the ability of the system to handle mixtures where the vapor pressure of one or more of the components is critical.

In addition to these advantages accuring directly from the factor of the reduced pressure drop requirement, a number of ancillary advantages can be obtained from the use of a plurality of serially connected, independently controlled column sections, and though plural column sections have been serially operated in previous chromatographic processes, it is believed that independent, individual control of the pressure drop across each successive column section is a novel concept originating with applicant.

Referring now to the drawings, a somewhat basic embodiment of the present invention is illustrated in FIGURE 1. An inlet conduit 10 is provided for conveying a mixture to the chromatography system for the purposes of analysis or preparation of relatively pure components by fractionation of the mixture. The inlet conduit may be connected to a bypass or branch conduit 12 for diverting or bypassing a mixture which is flowing in a continuous stream, such as a process stream, after a sample of the desired size has been admitted to the chromatographic system. The diversion of the continuously flowing mixture is accomplished by the use of control valves 14 and 16 provided in the conduits 10 and 12, respectively, and automatically controlled as hereinafter described. The mixture which can be resolved by the chromatographic system of the present invention and which is introduced to the system from the inlet conduit 10 can be either a gaseous, vaporous or finely divided liquid mist.

When the control valve 14 is opened and the control valve 16 is closed, the mixture to be chromatographically resolved is passed into a first, relatively short chromatographic column section 18 which, in accordance with procedures well understood in the technology of gas chromatography, contains a separatory packing material which is capable of effecting at least a partial resolution or separation of a plurality of components of the mixture. The column section 18 can be heated by any suitable method, if desired, so as to maintain a desired temperature over the length of the column. It is also within the purview of the invention to provide a thermal gradient along the length of the column by any heater device adapted for this purpose, many of which are now well known to the art.

Simultaneously with and following the introduction of the mixture to be resolved to the top of the column section 18, a pressurizing gas is introduced thereto by a suitable pipe or conduit 20 so as to maintain a relatively constant pressure at the head of the column and eliminate disturbances in the column due to pressure variation. In the preferred embodiment, the gas which is introduced to the column section 18 through the conduit 20 is an inert carrier gas of the type conventionally used in gas chromatography, such as helium, nitrogen or the like. It should be pointed out, however, that, in the broadest aspect of the invention, the pressurizing gas can be selected from other types of gases which may react with one or more of the components of the mixture introduced to the column section 18, or may display some unusual chemical or physical affinity for the packing substrate material. The source of the pressurizing gas entering the column section 18 through the conduit 20 will be hereinafter described in greater detail. Following introduction of the mixture to be separated into the column section 18, the control valve 14 is closed.

From the column section 18, the pressurizing gas along with the partially resolved components of the mixture introduced to the column via the inlet column 10 are eluted through a discharge conduit 22. The discharge conduit 22 is connected through a sensing unit or detector 23 and a control valve 24 to a second chromatographic column section 26 which also contains an adsorbent material for separating components of the gaseous mixture flowing through the system. A carrier gas recycle conduit 28 branches from the discharge conduit 22 upstream from the control valve 24 and contains a control valve 30, a heat exchanger 32, a compressor 34 and a sensing unit or detector 36. It should perhaps be pointed out that the compressor-heat exchanger combinations used in the system and hereinafter described may be arranged with either the compressor or the heat exchanger positioned upstream from the other of the two units. The detectors 23 and 36 are each capable of sensing and responding to variations in the pressures within their respective conduits 22 and 28 and of providing one or more signals in response to such pressure as hereinafter described. In addition to this capability of pressure responsiveness, the detector 23 also is capable of sensing the passage of the several components of the gaseous mixture therethrough, and providing signals indicative of the presence of the respective components as they pass through this device.

Branching from the recycle conduit 28 between the detector 36 and compressor 34 is a carrier gas make-up conduit 40. This conduit contains a control valve 42 and a heat exchanger 44 and is connected to a carrier gas make-up manifold 46.

The detector 23 is connected to the control valves 24 and 30 by leads 47 and 49 and to a suitable programmer-controller 50 by leads 52 and 53. The detector 36 is connected to the programmer-controller unit 50 by an electrical lead 54. Thus, as will be hereinafter explained in greater detail, signals generated by these sensing units in response to the variation of pressure in the respective conduits, as well as in response to variations in the composition of the gas moving therethrough (in the case of the detector 23 located in discharge conduit 22), are transmitted to the programmer-controller 50 for the purpose of permitting the status of the several control valves to be varied as hereinafter explained.

In the column section 26, which may contain the same or a different adsorbent material from that which is utilized in the section 18, further resolution of the several components of the mixture injected into the system via the inlet conduit 10 is accomplished. The movement of the mixture through the bed of packing material in the section 26 is accomplished by means of a pressurizing gas introduced to the column section through a conduit 58. The resolved components of the mixture, along with the pressurizing gas, are eluted from the column through a suitable discharge conduit 60 which passes through a detector 62 and a control valve 64 before entering the upper end of a third column section 66. A recycle conduit 67 is joined to the discharge conduit 60 upstream from the control valve 64 for use in the manner hereinafter described. Positioned in the recycle conduit 67 are a control valve 69, a heat exchanger 68, a compressor 70 and a sensing unit or detector 72. Entering the conduit 67 between the compressor 70 and the detector 72 is a carrier gas make-up conduit 76 which has positioned therein a control valve 78 and a heat exchanger 80. The carrier gas make-up conduit 76 is connected to, and receives carrier gas from, the carrier gas make-up manifold 46. The detectors 62 and 72 perform identical functions to the detectors 23 and 36, respectively, and are connected to the controller 50 by leads 84, 85, 86, respectively. Also, the detector 62 is connected by leads 88 and 90 to the control valves 64 and 69, respectively.

After the mixture to be resolved has entered the column section 66 via the conduit 60 for the purpose of further component resolution, the valve 64 is closed as hereinafter explained, and a pressurizing gas is introduced to the top of this third column section via a conduit 92. The effluent from the column section 66 is discharged through a discharge conduit 94 which passes through a detector 96 and, in the illustrated embodiment, branches into three product lines 98, 100 and 102. Control valves 104, 106 and 108 are provided in the product lines 98, 100 and 102, respectively, and each of these lines also contains a cold trap or similar heat exchange device for the purpose of condensing the resolved gaseous components of the mixture which as been passed through the system. These heat exchange devices used in the product lines 98, 100 and 102 are designated by reference numerals 110, 112 and 114, respectively. In the heat exchange devices 110, 112 and 114, the several products constituted by the several resolved, relatively pure components of the gaseous mixture are separated from the carrier gas, with the products being discharged through the product lines 98, 100 and 102, and the carrier gas being collected from each of the heat exchangers and passed into a recycle manifold line 116. Other types of suitable separatory devices could, of course, be used in lieu of, or in addition to, the heat exchange devices 110, 112 and 114 for separating carrier gas and products. The recycle manifold line 116 extends to a compressor 118. Between the compressor 118 and the column section 66, a heat exchanger 120 and a detector 122 are positioned in the conduit 116. The detector 122 senses variations in the pressure within the conduit 92 and transmits a signal through the lead 124 to the programmer-controller 50. The detector 96 senses both the pressure in the discharge conduit 94, and also the variation in the composition of the gaseous mixture passing therethrough, and transmits signals to the programmer-controller 50 by the leads 126 and 127, and to the control valves 104, 106 and 108 by the leads 130, 132 and 134, respectively.

A carrier gas make-up conduit 136 is connected to the recycle manifold line 116 between the heat exchanger 120 and detector 122 and contains a control valve 138 and heat exchanger 140. The other end of the conduit 136 is connected to the carrier gas make-up manifold 46. It should be pointed out that, if desired, automatic control of all heat exchangers can be effected from a suitably constructed programmer-controller and the heat exchangers in the recycle conduits can be operatively linked with the heat exchangers in the make-up conduits for interdependent operation, though such optional arrangements is not specifically illustrated.

For the purpose of controlling the pressure across each of the column sections 18, 26 and 66, and also in order to program the flow of fluids through the system, the programmer-controller 50 is connected to each one of the detectors hereinbefore described and receives the described signals therefrom. The programmer-controller may be a computer type control system or any other electronic, electrical or electro-mechanical system capable of providing the control functions hereinafter described. Such systems are well known in the art. The programmer-controller 50 is connected, in the illustrated embodiment, by suitable electrical leads 150 and 152 to the control valves 14 and 16 positioned in the inlet conduit 14 and the by-pass conduit 12, respectively. The programmer-controller 50 is also connected by output leads 156, 158 and 160 to the control valves 42, 78 and 138, respectively.

OPERATION

Let it be supposed that it is desired to separate or resolve the several components of a complex gaseous mixture which has several components therein having a very high vapor pressure. Let it also be assumed that the mixture to be separated would normally require a very lengthy column having a large number of theoretical plates in order to effect even a roughly complete separation of components, and it is determined that a high degree of purity or specific separation could not be obtained even with such an elongated conventional column. Moreover, it is calculated that a pressure drop of 120 p.s.i. would be required across such a column in order to maintain the desired flow rate therethrough, and to accomplish the fractionation of the mixture within anything like a reasonable and feasible time. Such a pressure drop would require, at best, an initial pressure at the inlet to the column of about 135 p.s.i.a. in order to discharge from the column at atmospheric pressure, and the high vapor pressure components of the sample would thus be condensed in the head of the column and could not be effectively moved therethrough or separated.

The system of the present invention offers an effective solution to the problem of cleanly and efficiently resolving a mixture of this type into its several components without the necessity to develop large inlet pressures to an elongated column. Initially, the mixture to be separate is moved by a suitable pump (not shown) in the inlet conduit 10 through the open valve 14 into the upper end of the column section 18. As the mixture enters the column section, an effective back pressure is developed in the conduit 20 and is sensed or detected by the detector 36. The pressure which is "seen" by the detector 36 is due in part to this back pressure resulting from the injected mixture and also in part to the flow in the conduit 20 of carrier gas supplied through the recycle conduit 28 and the make-up conduit 40 as hereinafter explained. The detector 36 will develop a signal in response to the pressure existing in the conduit 20, and such signal will be transmitted to the programmer-controller 50. Simultaneously, a signal is being transmitted to the programmer-controller 50 from the detector 23 and is indicative of the pressure existing within the discharge conduit 22. Upon receipt of the described signals from the detectors 36 and 23, the programmer-controller 50 develops a control signal which is transmitted through the lead 156 to the control valve 42 located in the carrier gas make-up conduit 40. This signal effectively controls the extent to which the valve 42 is opened so that a varying quantity of carrier gas is admitted to the conduit 20 in order to constantly maintain the desired pressure drop across the column section 18. The described control system also functions to maintain a desired ratio of carrier gas to the sample mixture at the inlet of the column at all times if such is required.

In the hypothetical example under consideration, let it be assumed that it is desirable to provide a pressure drop of 40 p.s.i. across the column section 18. The basis for this selection will hereinafter become apparent. This pressure will be sufficient to move both the carrier gas and the mixture to be resolved through the packing of this relatively short column section within a desired time and at a preselected flow rate. The temperature of the carrier gas supplied through the make-up conduit 40 and the recycle conduit 28 can be controlled as hereinafter described so that the interior of the column section 18 and the mixture of gases which move therethrough in a commingled state with the carrier gas are brought up to a desired temperature for optimum operation.

The packing within the column section 18 may be selected to accomplish any of several types of resolving effect upon the gaseous mixture being moved therethrough. Thus, a particular component of the mixture may be separated completely from all the remaining components, or a partial, yet incomplete resolution of several of the components may be accomplished in the column section 18, and may be further developed in the downstream column sections 26 and 66 as hereinafter described. In any event, the packing in the column section 18 exerts a desired separatory effect on the components of the sample mixture being moved therethrough.

The effluent gases discharged from the column section 18 move through a discharge conduit 22 into the column section 26 under a pressure which may, for example, be slightly above atmospheric pressure or higher. In passing through the discharge conduit 22, the pressure exerted by the effluent gases is sensed by the detector 23, and the composition of the gases moving through the detector at any instant of time is also continuously sensed. Signals which are correlated to the sensed pressure and composition within the discharge conduit 22 are transmitted through the leads 52 and 53 to the programmer-controller 50 which, as has been hereinbefore described, utilizes these signals for the purpose of operating the control valves 14, 16 and 42. Thus, the controller 50 may interrupt flow of a given mixture into the top of the column 18 and direct such mixture instead through the bypass conduit 12 by closing the valve 14 and opening the control valve 16. This manner of operation can be beneficially employed where a constantly flowing plant stream is to be semi-continuously resolved into its several components in a manner hereinafter described.

In addition to transmitting signals to the programmer-controller 50, the detector 23 can also be constructed to transmit control signals to the control valves 24 and 30 which may be solenoid valves or other suitable valves subject to remote control. As the components of the mixture to be passed through the system move through the detector 23 in the discharge conduit 22, the detector develops control signals which open the control valve 24 and close the control valve 30. Thus, at this time, the partially resolved mixture is moved into the upper end of the intermediate column section 26. After the elapse of a finite time following the passage of the components of the mixture through the detector 23, as sensed by the detector, signals are transmitted to the control valves 24 and 30 which close the valve 24 and open the valve 30. Thus, at this point in time, the effect is to trap the mixture which is to be resolved in the upper end of the intermediate column section 26, and to recycle carrier gas through the recycle conduit 28 and the conduit 20 to the top of the column section 18. As the carrier gas is recycled in the manner described, it is brought up to the desired inlet temperature by means of the heat exchange device 32 and is compressed to a pressure slightly lower than the required initial pressure by means of the compressor 34. As additional pressure is needed in the gas moving through the conduit 20 into the top of the column section 18 in order to obtain the desired pressure drop across the column section, the control valve 42 will be opened to the extent necessary to permit the injection of heated make-up carrier gas into the recycle conduit 28 from the make-up conduit 40. Thus, the desired pressure drop is constantly maintained across the column section 18. It will be understood, of course, that in some instances, it will be preferable to use only intermittent feed from the make-up conduit, with such feed being effected at such times as the control valve 30 is closed.

With the partially resolved mixture of gases from the column section 18 having been moved into the upper end of the column section 26 and the control valve 24 closed, the process which has been described with respect to the control of temperature and pressure in column section 18 is repeated. Thus, a pressurizing gas, which in the illustrated embodiment is an inert carrier gas, is introduced from a conduit 58 to the top of the column section 26 at a desired temperature and pressure as necessary to effect the desired resolution and achieve a predetermined pressure drop across the column section. The pressure of the gas in the conduit 58 is again automatically controlled through the actuating of the control valve 78 by the programmer-controller 50 in accordance with signals received from the detectors 62 and 72.

The type of packing material which is used in the column section 26 is subject to wide variation and will generally be chosen to complement the packing material used in the column section 18. Thus, for example, the packing material in the column section 18 may exert a strong retentive effect for one or several of the components in the mixture introduced to the system for resolution, whereas the packing material in the column section 26 exerts a relatively strong affinity for selected ones of the components which are not resolved at all by the packing material used in the column section 18.

With the gaseous mixture being employed in the hypothetical example, it may be assumed that it would be desirable to establish a pressure drop across the column section 26 of 40 p.s.i., and that under an existing pressure drop of this magnitude, the components of the mixture will be moved through this column section to the discharge conduit 60 within a desired time. As the carrier gas and the further resolved components of the mixture emerge from the column section 26 in the discharge conduit 60, these gases are sensed as to pressure and composition by the detector 62. Signals indicative of both pressure and composition are transmitted from the detector 62 to the programmer-controller 50 by the leads 84 and 85. Signals are also transmitted from the detector 62 to the control valve 64 and 66 so that, in the manner hereinbefore described, the components of the mixture are permitted to move into the upper end of the column section 66 which is then isolated by closure of the control valve 64. Subsequently to this time, the carrier gas substantially free of significant quantities of the sample mixture is recycled through the conduit 67 to the detector 72 and the conduit 58. In the course of this recycle of the carrier gas, it is heated by means of the heat exchanger 68 and is compressed using the compressor 70. Constant adjustment of the pressure existing in the conduit 58 by the use of the detector 72, the programmer-controller 50 and the control valve 78 is accomplished in the manner previously described.

Final resolution of the mixture which initially enters the chromatographic system through the inlet conduit 10 is accomplished in the column section 66. Here again, the type of packing may be varied considerably, and the pressure drop across the column section may be established at any desired level. In the example under discussion, a pressure drop of 40 p.s.i.g. would provide the desired total pressure drop through the system of about 120 p.s.i.g. Assuming that the partially resolved mixture has entered the top of the column section 66 at a pressure slightly above atmospheric pressure and will be discharged from the column section 66 at only a slightly lower pressure, it is then desirable to bring the control valve 138 from a nearly closed condition, at which very little pressure is developed in the conduit 92, to an open position sufficient to permit the pressure to be built up in the conduit 92 to approximately 40 p.s.i.g. With this build-up, the components of the mixture will be driven through the packing in the column section 66 and will undergo a final separation in the manner which is required to isolate certain desired components from each other in the effluent stream which emerges from this column section in the discharge conduit 94. As the several components pass through the discharge conduit 94, they are sensed by the detector 96, as is the total pressure existing within this conduit.

As has been said, the several components are, by the time of completing the transit of the column section 66, resolved so that they pass through the detector 96 at relatively widely separated points in time. Thus, the detector 96 can develop sequential signals for the operation of the control valves 104, 106 and 108 located in the product lines 98, 100 and 102, respectively. In this way, each of three different resolved components can be removed through separate product lines at the time that it emerges from the column section 66 through the discharge conduit 94. As the components mixed with carrier gas pass through their respective product lines 98-102, each component is condensed by one of the heat exchangers 110-114, and the carrier gas developed in this phase separation is collected in a carrier gas recycle manifold 116 and is delivered to the compressor 118. From the compressor 118, compressed recycle carrier gas passes through the heat exchanger 120 to the conduit 92. The extent of closure of the control valve 138 in the carrier gas make-up conduit 136 is constantly monitored and controlled by the programmer-controller 50 in the manner hereinbefore described.

From the foregoing described operation of the embodiment of the invention depicted in FIGURE 1, it will have become apparent that the pressure drop across each of the column sections 18, 26 and 66 has been maintained relatively low, and an absolute pressure exceeding about 40 p.s.i.g. has not been required as an inlet pressure to any of the column sections in order to achieve the required separation. At any time after the components of the mixture have cleared the detector 23 located downstream from the first column section 18, the system may be programmed by means of the programmer-controller 50 to open the valve 14, close the control valve 16, and permit another quantity of the same or a different mixture to be introduced to the column section 18.

It is to be pointed out that one of the advantages of the depicted system is that it can be programmed to permit thorough sweeping and scrubbing of the packing in each one of the column sections 18, 26 and 66 by providing a large amount of clean make-up carrier gas to be directed through these column sections at a high pressure between the times when a gaseous mixture is being directed through the column section for purposes of resolution.

In FIGURE 2 of the drawings, a multi-stage system incorporating the principles of the present invention is illustrated. In this multi-stage system, continuous handling of a mixture to resolve the mixture into a plurality of components can be accomplished. Thus, the multi-stage system can be used for continuously resolving a flowing plant stream consisting of a mixture of several components into the individual components. In the illustrated system, the stages which are included are designated by reference characters A, B and C. Each of these stages includes the serially connected, plural chromatographic column sections arranged and controlled as illustrated in FIGURE 1. The mixture which is to be resolved or separated into its components is introduced to the system by a charging conduit 200 which enters a temperature controlled holding chamber 202. The holding chamber 202 serves as an accumulator or storage tank, can be used to facilitate the surge-free introduction to, or mixture with, the sample components to be resolved, of a carrier gas, and also functions to bring the charge to be injected to the several stages of the system up to the temperature of the initial column section in each stage.

A mixture injection manifold 204 places the temperature controlled holding chamber 202 in communication with each of the stages A, B and C through control valves 206, 208 and 210 located in branch conduits 212, 214 and 216. The control valves 206, 208 and 210 correspond in their function and mode of operation to the control valves 14 and 16 depicted in the basic plural column section arrangement illustrated in FIGURE 1, and are connected by suitable electrical leads to a programmer-controller unit 220. The controller unit 220 is also connected by suitable leads to detectors 222, 224 and 226 positioned in discharge conduits 228, 230 and 232 which receive the effluent from the stages A, B and C, respectively. Each of the discharge conduits 228, 230 and 232 branches to provide a multiplicity of flow paths for accommodating the individual segregated components as they emerge in sequence from the respective stages A, B and C. Thus, in the case of stage A, the discharge conduit 228 communicates with branch discharge conduits 234, 236, 238 containing control valves 240, 242 and 244, respectively.

In the case of the discharge conduit 230, this conduit communicates with branch discharge conduits 246, 248 and 250 which contain control valves 252, 254 and 256, respectively.

The discharge conduit 232 from stage C communicates with branch discharge conduits 260, 262 and 264 which contain control valves 226, 268 and 270, respectively. A first product manifold line 272 is connected to, and receives product from, the branch discharge conduits 234, 246 and 260, from each of the stages. A second product manifold line 274 is connected to and receives product from the branch discharge conduits 236, 248 and 262 from the three stages. Finally, a third product manifold line 278 is connected to and receives product from branch discharge conduits 238, 250 and 264.

It will be noted that, as in the case of the unit depicted in FIGURE 1 of the drawings, each of the detectors 222, 224 and 226 is connected by suitable electrical leads with its respective set of control valves in the branch discharge conduits which are connected to the discharge conduit in which the respective detector is located. Thus, the control valves in these branch discharge conduits are actuated in response to signals developed by their respective detector, as the several separated components are eluted from the stages A, B and C in sequence. The detectors 222, 224 and 226 are also connected by suitable leads 276, 278 and 280 to the controller-programmer 220.

It is to be understood that all of the control circuitry which is utilized in the basic system of FIGURE 1 is employed in triplicate in the three stage system shown in FIGURE 2. Also, although it is not visible in the portions of the system which are discernible in FIGURE 2, a carrier gas make-up manifold is provided for supplying make-up carried gas to the column sections used in each of the three stages, such supply being effected in the controlled manner hereinbefore described.

In FIGURE 3 of the drawings, a modified embodiment of the present invention which permits greater versatility in use than the basic system depicted in FIGURE 1 is illustrated. Since some of the components employed in this system are substantially the same as those depicted in the basic embodiment of FIGURE 1, identical reference numerals have been utilized to identify identical components or elements of the two systems. Thus, the mixture of gases or vapors to be resolved are injected into the system through the sample injection conduit 10 which is provided with a branch or bypass conduit 12 which can lead to one or more duplicate stages similar to the single stage illustrated in FIGURE 3 and to be described. A pair of control valves 14 and 16 are provided in the conduits 10 and 12, respectively.

A first chromatographic column section 18 receives the mixture to be resolved from the conduit 10, and also receives a pressurizing gas, such as an inert carrier gas, from a conduit 20 which enters the top of the column section. The chromatographic column section 18 discharges through a discharge conduit 22 which passes through a sensing device or detector 290, and which has extending therefrom, a pair of branch discharge conduits 292 and 294. The discharge conduit 22 passes through the control valve 24, and enters the upper end of a second chromatographic column section 26. A carrier gas recycle conduit 28 is connected to the discharge conduit 22 at a point above the control valve 24 and contains a control valve 30, a heat exchanger 32 and a compressor 34. The opposite end of the carrer gas recycle conduit 28 from that which is connected to the discharge conduit 22 is connected to a sensing device or detector 36. A carrier gas make-up conduit 40 is connected to the carrier gas recycle conduit 28 at a point between the compressor 34 and the detector 36 and contains a control valve 42 and a heat exchanger 44. The carrier gas make-up conduit 40 receives make-up carrier gas from the carrier gas make-up manifold 46.

Branching from the discharge conduit 22 at points thereon between the detector 290 and the control valve 24 are a pair of branch discharge conduits 292 and 294. The branch discharge conduits 292 and 294 contain control valves 296 and 298, respectively, which are connected by suitable leads to the detector 290. It should be pointed out that, as has been hereinbefore explained, the control valves 296 and 298, which can typically be solenoid valves or other valves subject to remote control, could also be connected by suitable leads to a programmer-controller unit as hereinafter described and controlled from this unit instead of directly from the detector 290 if such construction should be preferred. The detector 290 is also connected by suitable leads 304 and 306 to the control valves 24 and 30, respectively. Finally, the detector 290 is connected by a suitable lead 308 to a programmer-controller unit 310 which functions in a manner hereinafter described.

The second or downstream chromatographic column section 26, in addition to being connected at its upper end to the discharge conduit 22 which places it in communication with the column section 18, is connected at its upper end to a pressurizing gas conduit 58 and at its lower end to a discharge conduit 310. The discharge conduit 310 divides into two branch discharge conduits 312 and 314 which contain control valves 316 and 318, respectively. The branch discharge conduits 312 and 314 also contain cold traps or other suitable heat exchangers 320 and 322, respectively. Carrier gas lines 324 and 326 extend from the heat exchangers 320 and 322 to a carrier gas recycle manifold 328 which contains a heat exchanger 330 and a compressor 332. A carrier gas make-up conduit 136 is connected to the recycle manifold 328 between the compressor 332 and the detector 72 and conveys make-up carrier gas from the carrier gas make-up manifold 46 through a heat exchanger 140 and control valve 138 to the recycle manifold 328.

In the operation of the modified embodiment of the invention depicted in FIGURE 3, a complex mixture of several gaseous components which it is desired to separate is introduced into the system via the mixture injection conduit 10. The pressure drop across the initial column section 18 is adjusted as hereinbefore described by controlled introduction of carrier gas (or other pressurizing gas) via the conduit 20. The column section 18 effectively separates a plurality of components from the gaseous mixture, and these isolated components are, by the control afforded by the detector 290 and the control valves 296 and 298 directed sequentially through the product branch conduits 292 and 294. The products flowing in the branch conduits 292 and 294 are separated from the carrier gas by any suitable means, such as by the heat exchangers 299 and 300, and the carrier gas then recycled through conduit 301 and heat exchanger 302. The remainder of the mixture which is unresolved is transferred through the discharge conduit 22 to the second or downstream column section 26, and the pressurizing operation is there repeated to establish the desired pressure drop across this second column section.

The packing in the column section 26 is selected to complement the packing in the column section 18, and to effect, in most instances, a separatory operation which is qualitatively different from that accomplished in the chromatographic column section 18. Thus, the residual portion of the gaseous mixture, which has been substantially unaffected and its components unresolved in the column section 18, can be transferred via the discharge conduit 22 into the column section 26, and by contact with a particular type of packing located therein, can be resolved into additional individual components by passage through this column section. The individual components eluted through the discharge conduit 310 are then sensed by the detector 311, and in the proper sequence, the control valves 316 and 318 are opened to permit the separated products to be discharged through the respective branch discharge conduit 312 and 314. In each of these conduits, a heat exchange device, such as a cold trap, is located, and in the cold traps 320 and 322 depicted in FIGURE 3, the isolated gaseous components are condensed for removal from the carrier gas, and the carrier gas is then recycled through the conduits 324 and 326 to the carrier gas recycle manifold 328. Of course, after passage through the cold traps 316 and 318, the recycled carrier gas will have to be returned to the temperature at which the column section 26 is operated, and this is accomplished with the heat exchanger 330.

The embodiment of the invention depicted in FIGURE 3 possesses the advantage of permitting a more versatile usage of the plural chromatographic sections than can be obtained with the system depicted in FIGURE 1. Thus, the option is presented of being able to remove certain fairly completely isolated or separated components between the first and second chromatographic column sections if this should be desirable, or in some cases necessary. On the other hand, if it is desired to operate the system depicted in FIGURE 3 exactly in the manner in which the system in FIGURE 1 is operated, the control valves 296 and 298 located in the branch discharge conduits 292 and 294 can be retained closed at all times during the operation of the system. Recycling of carrier gas and introduction of make-up carrier gas is carried out in substantially the same way in the case of both of the column sections 18 and 26 depicted in FIGURE 3 as has been described in referring to FIGURE 1.

In FIGURE 4 of the drawings, a further modification of the present invention is illustrated, which embodiment is the most versatile in its possibilities of utilization of any of the embodiments previously described. In this embodiment of the invention, a mixture injection conduit 350 is provided for injecting a gaseous or vaporous mixture which is to be separated into its several components, through a control valve 352 into a first chromatographic column section 354. A pressurizing gas conduit 356 is provided for introducing a pressure drop adjusting gas to the top of section 354 in the manner hereinbefore described. This gas is, as previously mentioned, preferably the inert carrier gas used in the chromatographic separation.

In the case of complex, difficultly separable mixtures, the partially resolved mixture may be eluted from the column section 354 through the discharge conduit 358, and passes through a sensing device or detector 360. The discharge conduit 358 branches into a plurality of product branch conduits 362, 364 and 366 for the purpose of removing separated, individual components of the mixture as hereinafter explained. The discharge conduit 358 is also provided with branches 368 and 370 extending to second and third chromatographic column sections 372 and 374, respectively. Control valves 376, 378, 380, 382 and 384 are provided in the conduits 362, 364, 366, 368 and 370, respectively. The product discharge branch conduits 362, 364 and 366 are also each provided with a product recovery unit, such as the cold traps or heat exchangers 386, 388 and 390, respectively.

The carrier gas recycled from these several heat exchange units is directed through the conduits 392, 394 and 396, respectively, to a common carrier gas collection conduit 398. The conduit 398 contains a heat exchanger 400 for the purpose of bringing the cooled carrier gas back to the temperature of operation of the column section 354 as hereinafter explained. The carrier gas collection conduit 398 is connected to a carrier gas recycle conduit 402 which is connected at one of its ends to the conduit 370 and contains a control valve 406, a heat exchanger 408 and a compressor 410. The opposite end of the carrier gas recycle conduit 402 is connected to a detector 412 which is also connected to the pressurizing gas conduit 356. A carrier gas make-up conduit 414 is connected to the carrier gas recycle conduit 402 between the detector 412 and the compressor 410 and contains a control valve 416 and a heat exchanger 418. Fresh carrier gas is supplied to the carrier gas make-up conduit 414 from a carrier gas make-up manifold 420.

The electronic control system which is used to operate the several control valves in the system is similar to that which has been hereinbefore described, and includes a programmer-controller 424 which is connected by leads 426 and 428 to the detectors 360 and 412, respectively, and by leads 430 and 432 to the control valves 416 and 352, respectively. Also, in the illustrated embodiment of the invention, the dector 360 is connected by leads 434, 436, 438, 440, 442 and 444 to the control valves 376, 378, 380, 382, 384 and 406, respectively, for the purpose of controlling these valves in accordance with the passage of certain components of the resolved mixture through this dector. It is to again be noted that, in certain instances, it would be a preferred construction to control these several control valves by signals originating at the programmer-controller unit 424, rather than to control them directly from the detector 360. Either system, however, is within the present design capability of those skilled in the art of electronics generally, and servo-systems in particular.

The conduit 368 branches from the discharge conduit 358 and enters a second relatively short chromatographic column section 372 at the upper end thereof. The column section 372 also has, communicating with the upper end thereof, a pressurizing gas conduit 450. The pressurizing gas conduit 450 contains a sensing device or detector 452 which is also connected to a carrier gas recycle conduit 454. The recycle conduit 454 contains a control valve 455, a heat exchanger 456 and a compressor 457 for purposes hereinbefore described. The effluent from the column section 372 is discharged through a discharge conduit 458 which contains a detector 459. The discharge conduit 458 also passes through a control valve 460 before entering the upper end of a fourth, relatively short chromatographic column section 462. Branching from the discharge conduit 458 between the dectector 459 and the control valve 460 is a product discharge conduit 464, in addition to the carrier gas recycle conduit 454. The product discharge conduit 464 contains a control valve 468 and is connected to any suitable means (not shown) for separating carrier gas from a relatively pure product. The control valves 455, 460 and 468 are connected by leads 469, 470 and 471, respectively, to the detector 459.

Entering the carrier gas recycle conduit 454 is a carrier gas make-up conduit 473 which passes through a heat exchanger 472 and a control valve 474. The control valve 474 is connected by a lead 475 to the programmer-controller 424. Fresh make-up carrier gas is fed through the make-up conduit 473 to the carrier gas recycle conduit 454 from a carrier gas make-up manifold 420. The control valve 474 is connected by a suitable electric lead to the programmer-controller 424 and is operated in response to control signals developed by the programmer-controller.

The column section 462 is in communication at the upper end thereof with a reaction gas conduit 480. The reaction gas conduit 480 contains a control valve 482 and a heat exchanger 484. In the illustrated embodiment, the control valve 482 is adapted to be controlled by a signal originating at the detector 459 and transmitted to the valve through a lead 483. This valve may, however, be automatically controlled from the programmer-controller 424, or may be manually controlled if desired. The effluent from the column section 462 is conducted by a discharge conduit 486 through a heat exchanger 488 or other separatory unit where at least one of the relatively pure products is separated from the residual gases as hereinafter described. These residual gases are then vented through a suitable conduit 490, and the separated component is removed by a product discharge line 492.

The gases which are conducted by the conduit 370 into the upper end of the column section 374 are there mixed with a pressurizing gas introduced through the pressurizing gas conduit 496. The effluent from the column section 374 moves through a discharge conduit 498 to a detector 500, and then through the control valve 502. A carrier gas recycle conduit 504 branches from the discharge conduit 498 and recycles carrier gas through a control valve 506, a compressor 508 and a heat exchanger 510 to a sensing device or detector 512. The detector 500 is connected by leads 513 and 514 to the valves 502 and 506, respectively, and by a lead 515 to the programmer-controller 424. The detector 512 is connected by the lead 516 to the programmer-controller. A carrier gas make-up conduit 517 is connected to the carrier gas recycle conduit 504 between the detector 512 and the heat exchanger 510 and contains a control valve 518 and a heat exchanger 520. The control valve 518 is connected by a suitable lead 522 to the programmer-controller 424.

In the operation of the embodiment of the invention depicted in FIGURE 4, a complex mixture of a number of components which are difficult to separate by a single elongated chromatographic column is moved into the column section 354 through the mixture injection conduit 350. When the sample has completed its flow into the column section 354, the timed program set into the programmer-controller 424 will effect the closure of control valve 352. Pressurizing gas then is continually introduced into the upper end of the column section 354 through the conduit 356 until the pressure drop across the conduit is brought to the desired level as indicated by the pressure signals received by the programmer-controller from the detectors 412 and 360. At this time, the programmer-controller 424 causes the control valve 416 to be partially closed, and the introduction of relatively high pressure make-up carrier gas to the system from the carrier gas make-up manifold 420 and the carrier gas conduit 414 is thereby reduced to a level sufficient to maintain the desired pressure differential across the column section. The components of the mixture, along with the propelling carrier gas, then move through the column section 354 and are eluted through the discharge conduit 358. As the mixture of carrier gas with resolved, as well as non-resolved, components moves through the detector 360, this device senses the composition of the gaseous mixture within the discharge conduit 358, and develops signals which control the state of closure of the control valves 376, 378, 380, 382, 384 and 406. The detector 360 also transmits a signal to the programmer-controller 424 indicative of the time at which all of the mixture has passed through the column section 354 so that the controller can cause the cycle to be repeated by reopening the control valve 352.

Assuming that the detector 360 is set so that the leading edge of the first component to be eluted from the column section 354 develops a signal effective to close the control valves 378, 380, 382, 406 and 384, a relatively pure cut of the leading component will then be directed through the product branch conduit 362 and the component will be condensed by the heat exchanger 386. The uncondensed carrier gas thus separated by phase difference from this pure component will be directed through the conduit 392 to the carrier gas manifold conduit 398 and will be recycled via the carrier gas recycle conduit 402 to the top of the column section 354. Assuming that there is poor resolution between the first and second components emerging from the column section 354, and that a better separation between these two components is desired, the detector 360 may next, after a pre-set period of time, close the valves 376, 378 and 380 in the branch discharge conduits 362, 364 and 366 and open one or the other of the valves 382 or 384 while retaining the valve 406 in the carrier gas recycle conduit 402 closed. Depending on which of the valves 382 or 384 is opened, this will permit the overlapped or unresolved portions of the first two components to be passed into either the column section 372 or the column section 374 for further separatory action. After this indistinct or overlapped interface existing between the first two components emerging from the column section 354 has passed through the detector 360 and into one of the downstream column sections, the detector can then develop a signal indicative of the relatively pure trailing edge of the second component. At this time, the control valves 376, 380, 382, 384 and 406 can be controlled to permit the relatively pure trailing edge of the second component to be passed through the product branch conduit 364 and removed from the carrier gas by the heat exchanger 388. Again at this time, the separated carrier gas is recycled via the conduits 394, 398 and 402 to the top of the column section 354.

For that portion of the gaseous mixture which follows the first two components, any one of several possible settings on the various control valves may be optionally employed, depending upon the nature of the separatory problem remaining at this point in the procedure. Thus, if, say the third component of the mixture in point of time of emergence from the column section 354, is well defined and is cleanly separated from other components of the mixture, all of the control valves in the product branch conduits 362 and 364, in the conduit 370 and in the carrier gas recycle conduit 402 may be closed, and the control valve 380 in the branch discharge conduit 366 permitted to remain open so as to divert this relatively pure third component through the heat exchanger 390 and thus recover it from the carrier gas by this means. The separated carrier gas is then recycled through the conduits 396, 398 and 402 in the manner previously described.

It may be well to note again at this point that the detector 360 (as well as all other detectors disposed in the effluent or discharge conduits from the several column sections), in addition to continuously sensing the composition of the effluent gases from the associated column section, also continuously senses the pressure of the gases passing through the detector. A signal correlated to the magnitude of this pressure is transmitted to the programmer-controller 424, and is used by this device for developing the control signals which regulate the extent of closure of control valve 412 so as to maintain the desired pressure drop across the column section. This control function is a common characteristic of the several embodiments of the invention which are herein described.

Difficultly separable portions of the mixture originally introduced to the first column section 354 which do not become separated in being passed through this column section may be directed to either of the column sections 372 or 374. These sections can be filled with packing materials having very different separatory capabilities, and can be used at different times to handle widely differing types of gaseous or vaporous mixtures. Assuming, for example, that after several relatively pure components have been removed through the branch discharge conduits 362, 364 and 366, there remains, in addition to the components thus removed, a group of incompletely resolved or separated components which are insufficiently pure to be beneficially recovered in this state. These may be directed into one of the column sections 372 or 374, and there separated by the use of an adsorbent packing material having a different affinity for various ones of the components than is characteristic of the adsorbent packing material used in the section 354. Thus, for example, assuming the portion of the original mixture which enters the column section 372 to contain three components which cannot be efficiently separated from each other in the section 454, one of these components may be resolved or isolated from the other two in the section 372 and, as it passes through the detector 459, serves as the basis for the origination of signals operating control valves 455, 468, 460 and 482.

By the properly timed, sequential closure and opening of these valves, the separated component can be removed from the effluent stream via the produce discharge conduit 464. The other two components, which are as yet unresolved, can then be directed into the column section 462. In this column section, the remaining two components can be merged with a selected reaction gas entering the column section through the reaction gas conduit 480. This gas may be selected because of a particular affinity for one of the two remaining components from the original gas mixture, or may be selected to combine chemically with one of these two gaseous components entering the column section 462 from the conduit 458 to form a reaction product easily separable from the other component. In this eventuality, the new product resulting from the combination of the one component from the original mixture with the selected reaction gas introduced to the column section 462 through the conduit 480 can be tailored to possess properties permitting it to be removed by the heat exchanger 488 or other separatory device, and may be discharged through the product discharge conduit 490 while the pure second component which does not react with the reactive gas entering through conduit 480 may be removed through the discharge conduit 492, assuming that it is the more easily condensible of the two effluent materials.

In some instances, a well-defined separation may be effected by the first column section 354 between two relatively large groups of components which are themselves inefficiently separated. These two groups may then be selectively directed into the two downstream column sections 372 and 374 where packing materials are provided which are capable of resolving the individual components in each of the two groups.

In the use of the system depicted in FIGURE 4, the same basic principles of recycle of carrier gas to the head of each of the column sections, along with the introduction of clean make-up carrier gas to this recycle stream with automatic individual pressure control being maintained over each of the column sections is retained. By the provision of several possibilities for split stream flow of the effluent from the first column section, and by the provision of a final column section receiving fluid having a particular affinity for either the adsorbent material, or for one or more of the components flowing through the last column section, versatility of the overall system is greatly increased and a great many types of gaseous mixtures can be resolved into many individual components by proper programming of the system.

Although several specific embodiments of the invention have been herein described in order to provide easily understood examples permitting the invention to be effectively practiced, it is to be understood that many variations and modifications of the depicted sysetems can be effected without departure from the basic operating principles which have been described. Thus, as has been pointed out in the specification, the several control valves may, in all instances, be controlled from the programmer-controller units which are provided, rather than, in some instances, being controlled directly from certain sensing devices or detectors located in various ones of the process streams. It will be further apparent that, though provision is made in several of the embodiments for removing two or three different components from the discharge conduits from the column sections at different times during the process, the system is theoretically unlimited as to the number of product branch conduits which can be provided for removing any number of components from the main discharge conduit at different points in time, depending upon the complexity of the gaseous mixture which is originally introduced to the system, and the number of column sections which are provided. As many stages of the several plural column section embodiments as may be desired can be used in any system which is required for a particular separation or pure component preparation requirement. Finally, it should also be pointed out that, though the depicted embodiments of the invention have been described as deriving the motivating carrier gas from a conduit entering the upper end of the several column sections separately from the mixture injection conduit, carrier gas, in the desired proportion, can be pre-mixed with the fluid mixture to be separated or resolved and the total mixture then introduced through a common conduit. In accordance with one of the basic principles of the invention, when this arrangement is utilized, a pressurizing gas is still employed, and is introduced to the respective column section by a separate conduit, and is automatically controlled to secure the desired pressure drop across the column section. All such innovations and changes as have been described, in addition to others which are clearly apparent from, or suggested by, the exemplary embodiments depicted and described herein, are deemed to be circumscribed by the spirit and scope of this invention except as the same may be necessarily limited by the appended claims.

What is claimed is:

1. Gas chromatography apparatus comprising:
   a plurality of chromatographc columns;
   conduit means serially interconnecting the several columns for sequential flow of gases therethrough, and providing a continuous system from the inlet of the first column in the series of columns to the outlet of the last column in said series;
   means for automatically and independently adjusting the pressure differential across each of said chromatographic columns concurrently with the sequential flow of gases therethrough whereby a predetermined pressure differential can be automatically established and maintained across each of said columns during the flow of gases threthrough, said pressure adjusting means including means for providing a higher pressure at the inlet of each column than the discharge pressure at the outlet of the preceding column in the series.

2. Gas chromatography apparatus as defined in claim 1 wherein said pressure adjusting means comprises:
   means for introducing a pressurizing gas to the inlet of each of said columns; and
   means for independently controlling the pressure of the pressurizing gas entering each of said columns.

3. Gas chromatography apparatus as defined in claim 1 wherein said pressure adjusting means comprises:
   means for sensing the pressure at the inlet and at the outlet of each of said columns;
   means responsive to said sensing means for independently raising and lowering the pressure in the first portion of each of said columns which is contacted by gases flowing therethrough.

4. Gas chromatography apparatus as defined in claim 1 wherein said pressure adjusting means comprises:
   means for recycling a selected portion of the effluent from each column to the inlet end of the respective column from which the effluent emanates; and
   means for individually increasing the pressure of the recycled portion of the effluent from each column.

5. Gas chromatography apparatus as defined in claim 1 and further characterized to include:
   at least one chromatographic column connected in parallel with the first column in said plurality of columns; and
   a common source of a fluid mixture to be fractionated conncted to the first, upstream column in said plurality of columns and to said columns connected in parallel with said plurality of columns.

6. Gas chromatography apparatus as defined in claim 1 wherein said conduit means comprises:
   connecting conduits extending between each adjacent pair of said columns to provide a flow path from the inlet of a first of said plurality of columns to the outlet of a last of said plurality of columns;
   at least one product branch conduit connected to, and branching from, at least one of said connecting conduits; and
   valves in said product branch conduits and the connecting conduits to which they are connected for selectively controlling the flow of effluent in said conduits.

7. Gas chromatography apparatus as defined in claim 2 wherein said means for introducing a pressurizing gas to the inlet of each of said columns comprises:
   a recycle conduit connected to said conduit means downstream from each of said columns and connected to the upstream end of the respective column for recycling a portion of the effluent from each column;
   a compressor in each of said recycle conduits; and
   means for introducing an inert carrier gas to the inlet of each of said columns at a pressure which is higher than the average pressure in said recycle conduit between the compressor therein and the inlet of each column.

8. Gas chromatography apparatus as defined in claim 2 wherein said means for independently controlling the pressure of the pressurizing gas comprises:
   means for simultaneously sensing the pressure at the inlet and at the outlet of each individual one of said columns;
   valve means controlling the introduction of said pressurizing gas to the inlet of each of said columns; and
   control means connected to, and responsive to, each of said sensing means, and connected to said valve means for individually controlling the valve means associated with each of said columns.

9. Gas chromatography apparatus as defined in claim 4 wherein said means for individually increasing the pressure of said recycled portion of effluent comprises:
- a compressor receiving said recycled portion; and
- means for selectively introducing a high pressure gas to said recycled effluent portion.

10. Gas chromatography apparatus as defined in claim 6 wherein said pressure adjusting means comprises:
- a recycle conduit connected to each of said connecting conduits and to the inlet of the respective column connected to said connecting conduit for discharge thereinto;
- a control valve in each of said recycle conduits for selectively controlling fluid flow therethrough;
- a make-up gas conduit connected to each of said recycle conduits; and
- a source of high pressure make-up gas connected to each of said make-up gas conduits.

11. Gas chromatography apparatus as defined in claim 10 and further characterized to include:
- a control valve in each of said make-up gas conduits;
- sensing means for sensing the pressure at the inlet and outlet of each of said columns; and
- control means responsive to said sensing means for operating the control valves in each of said make-up gas conduits to effect the described pressure differential adjustment.

12. Gas chromatography apparatus as defined in claim 11 and further characterized to include detecting means in each of said discharge conduits for detecting the composition of effluent gases flowing therethrough, and each connected to said control means;
- and wherein said control means is connected to the control valves in each of said recycle conduits and to said valves in said product branch conduits and is responsive to said detecting means for directing by programmed valve control, the flow of effluent from said columns to a selected one of the downstream columns, the product branch conduits and the recycle conduits.

13. Gas chromatography apparatus as defined in claim 12 and further characterized to include
- a compressor in each of said recycle conduits; and
- means in said recycle conduits and said make-up gas conduits for controlling the temperature of fluids moving therethrough.

14. Gas chromatography apparatus comprising:
- a plurality of chromatographic columns connected to each other for serial flow of gases in consecutive sequence therethrough;
- conduit means connected between the effluent discharge end of each column and the inlet end thereof for recycling a portion of the gases passed through each column;
- means for automatically and selectively controlling the flow of gases between said columns and through said conduit means; and
- means for automatically and continuously adjusting the pressure in said conduit means to attain, and continuously maintain, a preselected pressure drop across each of said columns independently of the pressure drop across each of the other of said columns.

15. Gas chromatography apparatus as defined in claim 14 and further characterized to include means for periodically and automatically introducing a gaseous mixture to the inlet end of the first of said plurality of connected columns for serial flow through the columns.

16. Gas chromatography apparatus as defined in claim 14 and further characterized to include heat exchange means connected to the effluent discharge end of at least one of said columns for effecting a separation of some of the gaseous components of the effluent by condensing at least one of said components.

17. Gas chomatography apparatus as defined in claim 14 and further characterized to include heat exchange means in each of said conduit means for adjusting the temperature of recycled gases passing through said conduit means.

18. Gas chromatography apparatus as defined in claim 14 wherein said means for adjusting the pressure in said conduit means comprises:
- a source of pressurizing gas;
- a conduit interconnecting said source of pressurizing gas with each of said conduit means; and
- means in each of said interconnecting conduits for controlling the pressure at which pressurizing gas from said source of pressurizing gas enters said conduit means.

19. In a gas chromatographic system of the type having a plurality of columns serially interconnected by conduit means to provide sequential flow of gases mixed with a carrier gas therethrough, the improvement which comprises:
- a carrier gas recycle conduit associated with each of said columns and connected between the discharge end of each column and the inlet end thereof;
- means for introducing make-up carrier gas to each of said recycle conduits; and
- means for automatically and individually controlling the pressure at which make-up carrier gas is introduced to each of said recycle conduits.

20. The improvement claimed in claim 19 and further characterized to include means for automatically and selectively controlling the flow of effluent gases from each of said columns to periodically direct relatively pure carrier gas through the recycle conduit associated with each of said columns, and at different times, to direct a mixture of carrier gas and other gases to another of said columns from that from which said effluent is derived.

21. The improvement claimed in claim 19 and further characterized to include means for automatically periodically removing one of said gases other than said carrier gas from the effluent gases emanating from at least one of said columns.

22. The improvement claimed in claim 19 wherein said means for controlling the pressure at which make-up carrier gas is introduced to each of said recycle conduits comprises:
- valves controlling the introduction of make-up carrier gas to each of said recycle conduits;
- means sensing the pressure at the inlet and at the outlet of each column; and
- programmer-controller means connected to said sensing means and responsive thereto, and connected to said valves for individually controlling said valves in response to variations in the sensed pressure differential across each of said columns.

23. The method of separating a fluid mixture into at least two of its individual components comprising:
- passing the mixture in a vapor state and in consecutive sequence through a plurality of serially connected column sections each containing an adsorbent separatory packing material which is characterized in having a differing affinity for a portion of the individual components in said mixture than for at least one other of said individual components;
- introducing a pressurizing gas to each of said column sections at the inlet thereof concurrently with the passage of said mixture through each column section; and
- independently adjusting the pressure drop across each of said column sections as at least a portion of said mixture passes through each column section by controlling the pressure at which said pressurizing gas is introduced to each column section.

24. The method defined in claim 23 and further characterized to include the step of
- recycling pressurizing gas eluted from each of said column sections to the inlet of the respective column section from which it is eluted at a time when the concentration of the components of said mixture in said pressurizing gas is at a minimum and while components of said mixture are flowing through at least one other of said column sections.

25. The method defined in claim 24 and further characterized to include the step of removing at least one of the components of said mixture from the gaseous mixture flowing between two of said column sections.

26. The method of fractionating a fluid mixture which comprises:

passing the mixture through at least one chromatography column containing a packing material which adsorptively retains one portion of the mixture longer than another portion thereof; then passing at least one of said portions of the mixture into another charomatography column containing a packing material; and simultaneously with the passage of said one portion of said mixture into said other column, introducing to said other column, a gaseous material which forms with a first part of the portion of the mixture passed into said other column, a material for which the packing material in said other column demonstrates a different affinity than is demonstrated by the packing material for the remaining part of the portion of the mixture passed into said other column.

27. The method defined in claim 26 and further characterized to include the steps of:

introducing a pressurizing gas to said first mentioned column at the inlet end thereof independently of, and concurrently with, the passage of said fluid mixture therethrough; and continuously controlling the pressure at which said pressurized gas is introduced to said first-mentioned column to maintain a pre-determined pressure drop across said first-mentioned column.

28. The method defined in claim 27 and further characterized to include the step of recycling a portion of the pressurizing gas eluted from said first-mentioned column to the inlet thereof.

29. The method of chromatographically fractionating a fluid mixture which comprises:

passing the mixture through a first chromatographic column section and then sequentially passing at least a part of the mixture through at least one additional chromatographic column section with all of said sections being serially interconnected;

extracting from the effluent from each column section, carrier gas from said effluent and recycling said gas to the inlet of the respective columns; and continuously introducing carrier gas at a controlled predetermined pressure to the inlet of each of said column sections concurrently with the passage of the portion of said mixture which is passed therethrough.

30. The method defined in claim 29 wherein said fluid mixture is periodically passed through said column sections and thus is periodically merged in each of said columns sections with said continuously introduced gas.

31. The method defined in claim 30 wherein said continuously introduced gas is controlled to provide a substantially constant, predetermined pressure drop across each of said column sections.

32. The method defined in claim 31 and further characterized to include the step of separating some of the components of said mixture from the remainder of said mixture and from said continuously introduced gas at a point between two of said column sections.

References Cited

UNITED STATES PATENTS

| 3,374,607 | 3/1968 | Fisher et al. | 55—197 |
| 3,002,583 | 10/1961 | Findlay | 183—2 |
| 3,174,326 | 3/1965 | Carle et al. | 73—23.1 |
| 3,250,057 | 5/1966 | Clarke | 55—67 |

FOREIGN PATENTS

| 692,119 | 8/1964 | Canada. |
| 1,130,204 | 5/1962 | Germany. |
| 1,201,093 | 9/1965 | Germany. |

OTHER REFERENCES

"Circular Gas Chromatography," Nature, vol. 183, February 1959, pp. 391–2.

"Use of Gas-Liquid Partition Chromatography as a Preparative Method," Nature, vol. 177, January 1956, pp. 84–85.

RICHARD C. QUEISSER, *Primary Examiner.*

VICTOR J. TOTH, *Assistant Examiner.*

U.S. Cl. X.R.

55—197, 67